2,966,483
GREEN POLYAZO-DYESTUFFS

Helmut Gies, Hofheim, Taunus, Germany, assignor to Farbwerke Hoechst Aktiengesellschaft vormals Meister Lucius & Bruning, Frankfurt am Main, Germany, a corporation of Germany No Drawing. Filed Dec. 17, 1957, Ser. No. 703,272

Claims priority, application Germany Dec. 21, 1956

4 Claims. (Cl. 260—171)

The present invention relates to valuable new green polyazo-dyestuffs and to a process for preparing the same; more particularly it relates to azo-dyestuffs corresponding to the following general formula

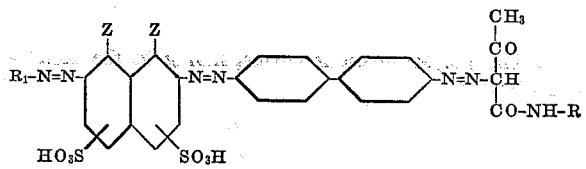

wherein the diphenyl nucleus may contain substituents, R represents the radical of an aryl sulfonic acid, $R_1$ represents a radical of the benzene or naphthalene series, one Z stands for the OH-group and the other Z stands for the $NH_2$-group.

I have found that vivid green polyazo-dyestuffs, which are especially suitable for dyeing all kinds of leather, are obtained by coupling in any order of succession 1 mol of the tetrazo-compound from a diaminodiphenyl which may contain substituents in both nuclei, and 1 mol of a diazo-compound of the benzene or naphthalene series with 1 mol of 1-amino-8-hydroxynaphthalene-3,6-disulfonic acid or 1-amino-8-hydroxynaphthalene-4,6-disulfonic acid and combining the diazodisazo-compound so obtained with 1 mol of an acetoacetylaminoaryl sulfonic acid obtainable for example by diketenizing an aromatic amino-sulfonic acid which may contain further substituents.

The new dyestuffs dye leather very uniform green tints which possess a good fastness to washing and a very good resistance to acids, alkalis and formaldehyde. On account of their good penetrating properties they are especially suitable for dyeing velvet leather which does not lighten when it is subsequently buffed.

As compared with the trisazo-dyestuffs described in German Patent No. 737,626 which are prepared with the use of unsulfonated acetoacetic acid arylamides as end components, the dyestuffs of the present invention are distinguished by an improved solubility even in cold water so that they are suitable for brush dyeing from a cold bath.

The following examples illustrate the invention, but they are not intended to limit it thereto, the parts being by weight.

Example 1

18.4 parts of benzidine are tetrazotized and coupled in a weak mineral acid solution with 31.9 parts of 1-amino-8-hydroxynaphthalene-3,6-disulfonic acid. The diazoazo-compound so obtained is coupled in a soda-alkaline medium with the diazo-compound from 20.3 parts of 1-amino-2-methoxybenzene-5-sulfonic acid. A solution alkaline with caustic soda from 25.7 parts of 1-acetoacetylaminobenzene-4-sulfonic acid is run into the diazodisazo-compound so obtained. The green trisazo-dyestuff is rapidly formed. After 2 hours the solution is rendered acid with mineral acid and heated to 85° C. The dyestuff is then precipitated with sodium chloride, filtered off with suction and dried. It is a black powder which dissolves in water to give an emerald green solution and dyes leather beautiful yellowish green tints of good general fastness properties. The dyestuff corresponds to the following formula:

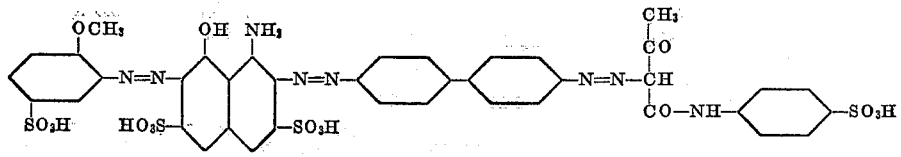

Instead of 1-amino-2-methoxybenzene-5-sulfonic acid there may also be used other sulfonated or unsulfonated amines, such as 1-amino-4-nitrobenzene-2-sulfonic acid, 1-amino-4-methylbenzene-3-sulfonic acid, 1-aminonaphthalene-6(7)-sulfonic acid, 1-amino-4-acetylaminobenzene-2-sulfonic acid, 1-amino-2-methyl-3-chlorobenzene-5-sulfonic acid, aniline, 1-amino-4-nitrobenzene or 1-amino-4-methoxybenzene. The dyestuffs so obtained dye leather yellowish to bluish green tints of good general fastness properties.

When in the above example the acetoacetyl compound of 1-aminobenzene-4-sulfonic acid is replaced by the acetoacetyl compounds of 1-aminobenzene-2-sulfonic acid, 1-aminobenzene-3-sulfonic acid, 1-amino-4-methylbenzene-3-sulfonic acid, 1-amino-8-hydroxynaphthalene-3,6-disulfonic acid, 2-amino-5-hydroxynaphthalene-7-sulfonic acid, 4-aminodiphenylamine-2-sulfonic acid, 1-aminonaphthalene-6(7)-sulfonic acid, or by the diacetoacetyl compound of 4,4'-diaminodiphenyl-2,2'-disulfonic acid, readily soluble dyestuffs are obtained which dye leather likewise yellowish to bluish green tints of good fastness properties.

When 1-amino-8-hydroxynaphthalene-4,6-disulfonic acid is used instead of 1-amino-8-hydroxynaphthalene-3,6-disulfonic acid or the benzidine is replaced by 4,4'-diamino-3,3'-dichlorodiphenyl, there are obtained green dyestuffs possessing a somewhat improved fastness to light.

Example 2

25.3 parts of 1-aminobenzene-2,5-disulfonic acid are diazotized and coupled in a weak mineral acid medium with 31.9 parts of 1-amino-8-hydroxynaphthalene-3,6-disulfonic acid. When the coupling is complete, there is added drop by drop a tetrazo solution from 18.4 parts of benzidine in a soda-alkaline medium. As soon as the diazodisazo-compound is formed, a caustic-alkaline solution of 25.7 parts of 1-acetoacetylaminobenzene-4-sulfonic acid is run in. The trisazo-dyestuff is rapidly formed. The solution is stirred for a further 2 hours, then adjusted with hydrochloric acid to a pH-value of 2, heated to 85° C. and the dyestuff is precipitated by the addition of sodium chloride. It is filtered off with suction and dried. A black powder is obtained which dissolves very readily even in cold water to give a dark green solution and dyes leather very vivid green tints of good fastness properties. The dyestuff corresponds to the following formula:

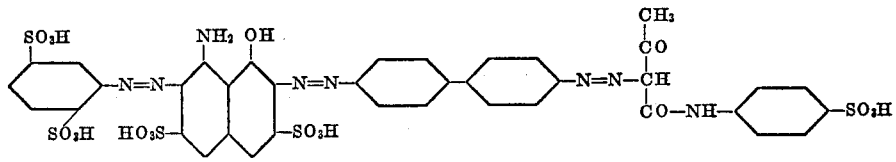

Instead of 1-aminobenzene-2,5-disulfonic acid there may also be used other amines the diazo compound of which is active enough to couple with 1-amino-8-hydroxy-naphthalene-3,6-disulfonic acid in a mineral acid medium.

The procedure described in Example 2 enables to use substituted benzidines which according to experience can only difficulty be coupled completely on one side in an acid medium, such as 4,4'-diamino-3,3'-dimethoxydi-phenyl. The dyestuffs so obtained dye leather likewise green tints which possess good fastness properties.

I claim:
1. The polyazo-dyestuff corresponding to the following formula

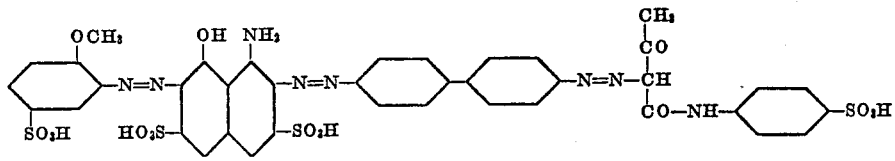

2. The polyazo-dyestuff corresponding to the following formula

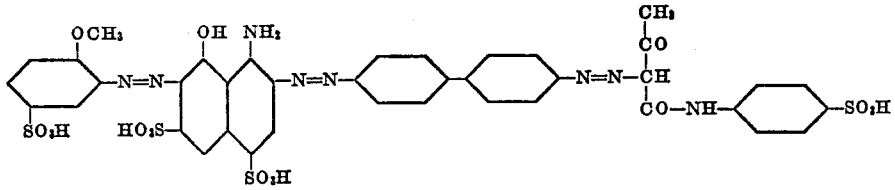

3. The polyazo-dyestuff corresponding to the following formula

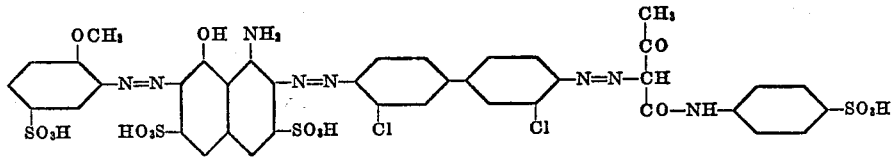

4. The polyazo-dyestuff corresponding to the following formula

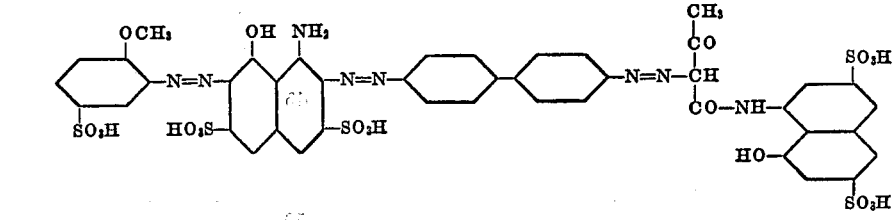

References Cited in the file of this patent
UNITED STATES PATENTS
2,202,350    Lier _____ May 28, 1940
FOREIGN PATENTS
737,626    Germany _____ July 20, 1943